United States Patent
Kjellman

(10) Patent No.: US 8,172,988 B2
(45) Date of Patent: May 8, 2012

(54) DISTILLATION SYSTEM WITH VERTICALLY ORIENTED ROTATING PLATES

(75) Inventor: Samuel T. Kjellman, Weare, NH (US)

(73) Assignee: Distillation Technologies, LLC, Weare, NH (US)

( * ) Notice: Subject to any disclaimer, the term of this patent is extended or adjusted under 35 U.S.C. 154(b) by 375 days.

(21) Appl. No.: 12/572,570

(22) Filed: Oct. 2, 2009

(65) Prior Publication Data

US 2010/0243425 A1   Sep. 30, 2010

Related U.S. Application Data

(60) Provisional application No. 61/106,168, filed on Oct. 17, 2008.

(51) Int. Cl.
*B01D 3/10* (2006.01)
*B01D 3/00* (2006.01)
*B01D 1/26* (2006.01)
*B01D 1/22* (2006.01)

(52) U.S. Cl. ............. 203/99; 203/10; 203/26; 159/11.1; 159/12; 159/17.1

(58) Field of Classification Search .................. 202/175, 202/238, 265; 203/10, 11, 89; 159/5, 6.1, 159/6.2, 6.3, 7, 9.1, 11.1, 11.3, 12, 25.1, 159/28.6, 4.3, 8, 9.2, 10, 11.2
See application file for complete search history.

(56) References Cited

U.S. PATENT DOCUMENTS

| | | | | |
|---|---|---|---|---|
| 17,448 A * | 6/1857 | Partz | ............................... | 159/10 |
| 769,557 A * | 9/1904 | Von May | ........................ | 165/92 |
| 998,020 A * | 7/1911 | Mabee | ............................. | 159/49 |
| 1,501,515 A * | 7/1924 | Testrup | ........................... | 159/12 |
| 1,968,351 A * | 7/1934 | Pieper | ............................ | 165/121 |
| 2,240,376 A * | 4/1941 | Nyquist | .......................... | 159/10 |
| 2,290,917 A * | 7/1942 | Smith | ........................... | 264/349 |
| 2,589,406 A * | 3/1952 | Latham, Jr. | ....................... | 203/2 |
| 3,196,087 A * | 7/1965 | Lustenader | ................... | 202/236 |
| 3,200,051 A * | 8/1965 | Silvern | .......................... | 202/236 |
| 3,301,236 A * | 1/1967 | Bratton | ......................... | 123/59.2 |
| 3,489,654 A * | 1/1970 | Geiringer | ........................ | 203/26 |
| 3,503,433 A * | 3/1970 | Pietro et al. | ..................... | 159/44 |
| 3,522,151 A | 7/1970 | Dismore | | |

(Continued)

FOREIGN PATENT DOCUMENTS

DE             757085 A      9/1956

(Continued)

*Primary Examiner* — Duane Smith
*Assistant Examiner* — Patrick McCarty
(74) *Attorney, Agent, or Firm* — Hayes Soloway P.C.

(57) ABSTRACT

The system contains a liquid-tight enclosure. An input source is connected to the liquid-tight enclosure for inputting water into the liquid-tight enclosure. A heating element is in thermal communication with at least a portion of the water within the liquid-tight enclosure. A plurality of substantially vertical plates are aligned along a substantially horizontal axis within the liquid-tight enclosure. Each of the substantially vertical plates has an opening. A groove is formed along each of the substantially vertical plates. A first end of the groove on each of the substantially vertical plates is proximate to the opening. At least one manifold extends through a plurality of the openings of the substantially vertical plates. The manifold is in fluid communication with a plurality of the first ends of the grooves. An output opening is formed in the liquid-tight enclosure. The output opening is arranged in fluid communication with the manifold.

21 Claims, 6 Drawing Sheets

U.S. PATENT DOCUMENTS

| | | | | |
|---|---|---|---|---|
| 3,764,483 | A | * | 10/1973 | Tleimat ......................... 202/236 |
| 4,329,204 | A | | 5/1982 | Petrek et al. |
| 4,402,793 | A | | 9/1983 | Petrek et al. |
| 4,863,567 | A | | 9/1989 | Raley |
| 5,409,576 | A | * | 4/1995 | Tleimat ......................... 202/174 |
| 5,575,889 | A | | 11/1996 | Rosenblad |
| 6,238,524 | B1 | * | 5/2001 | Zebuhr ....................... 202/185.1 |
| 6,309,513 | B1 | | 10/2001 | Sephton |
| 6,423,187 | B1 | | 7/2002 | Zebuhr |
| 6,908,533 | B2 | | 6/2005 | Zebuhr |
| 7,427,336 | B2 | | 9/2008 | Zebuhr |
| 2002/0008009 | A1 | | 1/2002 | Lemme et al. |
| 2002/0040844 | A1 | | 4/2002 | Zebuhr |
| 2005/0279620 | A1 | | 12/2005 | Zebuhr |
| 2007/0193870 | A1 | | 8/2007 | Prueitt |

FOREIGN PATENT DOCUMENTS

| | | | |
|---|---|---|---|
| GB | 757085 | * | 9/1956 |
| WO | 00/35551 | A1 | 6/2000 |
| WO | 00/35552 | A1 | 6/2000 |

* cited by examiner

DISTILLATION SYSTEM WITH VERTICALLY ORIENTED ROTATING PLATES

CROSS REFERENCE TO RELATED APPLICATION

This application claims benefit of U.S. Provisional Application Ser. No. 61/106,168 filed Oct. 17, 2008, the entire disclosure of which is incorporated herein by reference.

FIELD OF THE INVENTION

The present invention is generally related to a distillation system, and more particularly is related to a distillation system with vertically oriented rotating plates.

BACKGROUND OF THE INVENTION

The use of a distillation process, which is evaporation and condensation of the vapors, for the separation of liquids has been known for some time. Most commercial distillation systems utilize a simpler boiler to vaporize the liquid and draw off a vapor into a condenser where it is condensed and recovered. Such systems, however, require a significant amount of energy, which is in short supply in many third world countries that have trouble producing safe drinking water.

Vapor compression distillation has also been known for some time and is a more thermally efficient system of distillation wherein a compressor is utilized to elevate the temperature of steam. The steam temperature enables systemic thermal exchange wherein heat dissipated in condensation is exchanged through a thermally conductive barrier to induce heat for vaporization in a continuous process of thermal exchange. Vapor compression distillation systems present operational and commercialization challenges wherein opportunities for configuration improvements are presented.

Thus, a heretofore unaddressed need exists in the industry to address the aforementioned deficiencies and inadequacies.

SUMMARY OF THE INVENTION

Embodiments of the present invention provide a system and method for distilling water. Briefly described, in architecture, one embodiment of the system, among others, can be implemented as follows. The system contains a liquid-tight enclosure. An input source is connected to the liquid-tight enclosure for inputting water into the liquid-tight enclosure. A heating element is in thermal communication with at least a portion of the water within the liquid-tight enclosure. A plurality of substantially vertical plates are aligned along a substantially horizontal axis within the liquid-tight enclosure. At least a portion of each of the substantially vertical plates is submerged within the water inside the liquid-tight enclosure. Each of the substantially vertical plates has an opening. A groove is formed along each of the substantially vertical plates. A first end of the groove on each of the substantially vertical plates is proximate to the opening. At least one manifold extends through a plurality of the openings of the substantially vertical plates. The manifold is in fluid communication with a plurality of the first ends of the grooves. An output opening is formed in the liquid-tight enclosure. The output opening is arranged in fluid communication with the manifold.

The present invention can also be viewed as providing methods for distilling liquid. In this regard, one embodiment of such a method, among others, can be broadly summarized by the following steps: inputting a liquid into a liquid-tight enclosure; heating the liquid within the liquid-tight enclosure; rotating a plurality of substantially vertical plates aligned along a substantially horizontal axis within the liquid-tight enclosure, wherein at least a portion of each of the substantially vertical plates is submerged within the liquid inside the liquid-tight enclosure, and wherein each of the substantially vertical plates has an opening; collecting fluid within a groove formed along each of the substantially vertical plates; feeding the collected fluid from the grooves to at least one manifold traversing the openings of the substantially vertical plates; and outputting fluid from the manifold.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1A is a perspective view of a portion of the distiller, in accordance with the first exemplary embodiment of the present invention.

FIG. 5A is a perspective view of a portion of the distiller of FIG. 3, in accordance with the second exemplary embodiment of the present invention.

DETAILED DESCRIPTION

Figure 1:
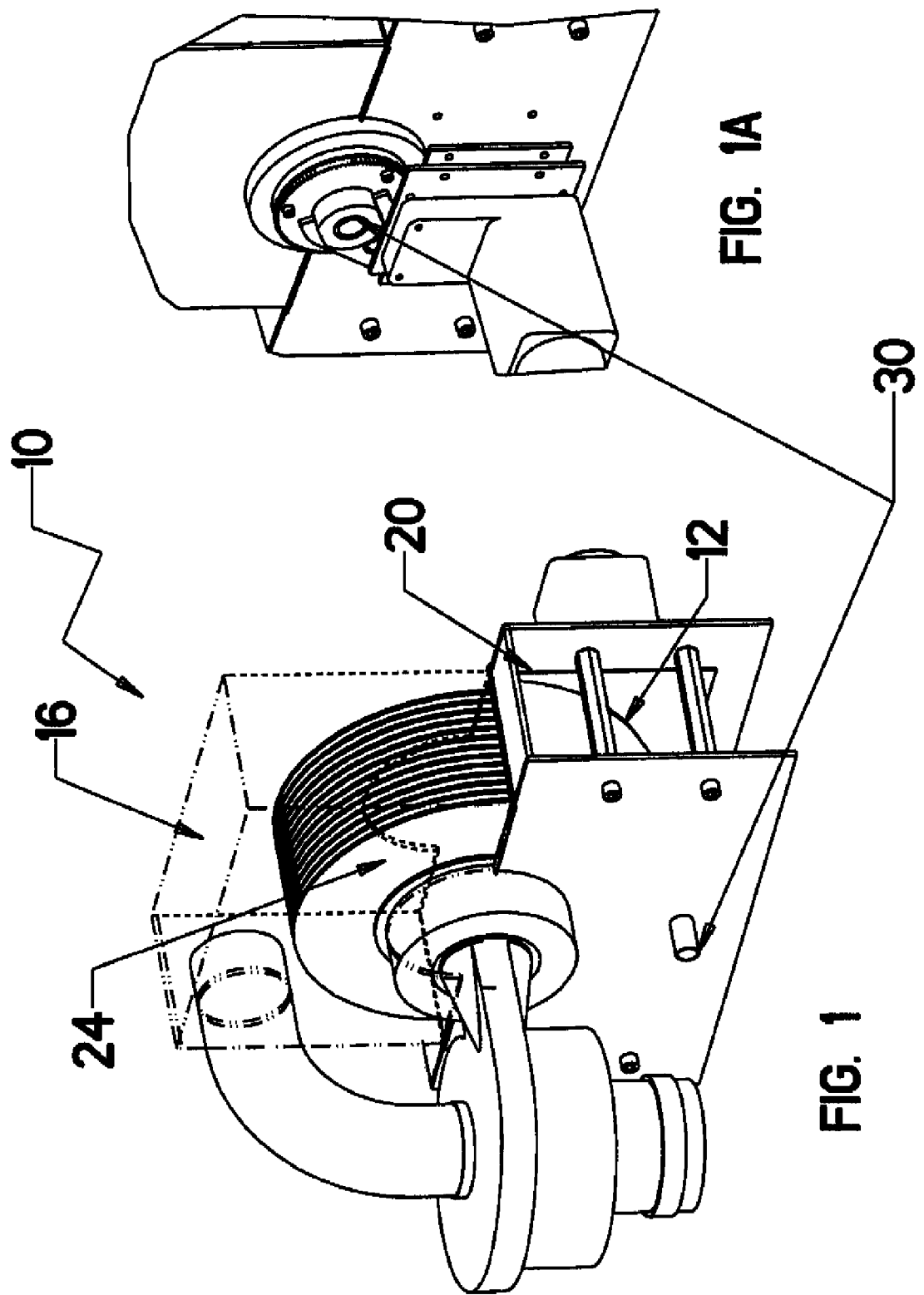
FIG. 1 is a perspective view of a distiller, in accordance with a first exemplary embodiment of the present invention.

FIG. 1 is a perspective view of a distiller 10, in accordance with a first exemplary embodiment of the present invention. The distiller 10 contains a liquid-tight enclosure 20. An input source (not shown) is connected to the liquid-tight enclosure 20 for inputting a quantity of water into the liquid-tight enclosure 20. The quantity of water may include a predetermined quantity of water or a quantity of water determined by a flow rate. A heating element (not shown) is in thermal communication with at least a portion of the quantity of water within the liquid-tight enclosure 20. A plurality of substantially vertical plates 24 are aligned along a substantially horizontal axis 14 (shown in FIG. 2) within the liquid-tight enclosure 20.

Figure 2:
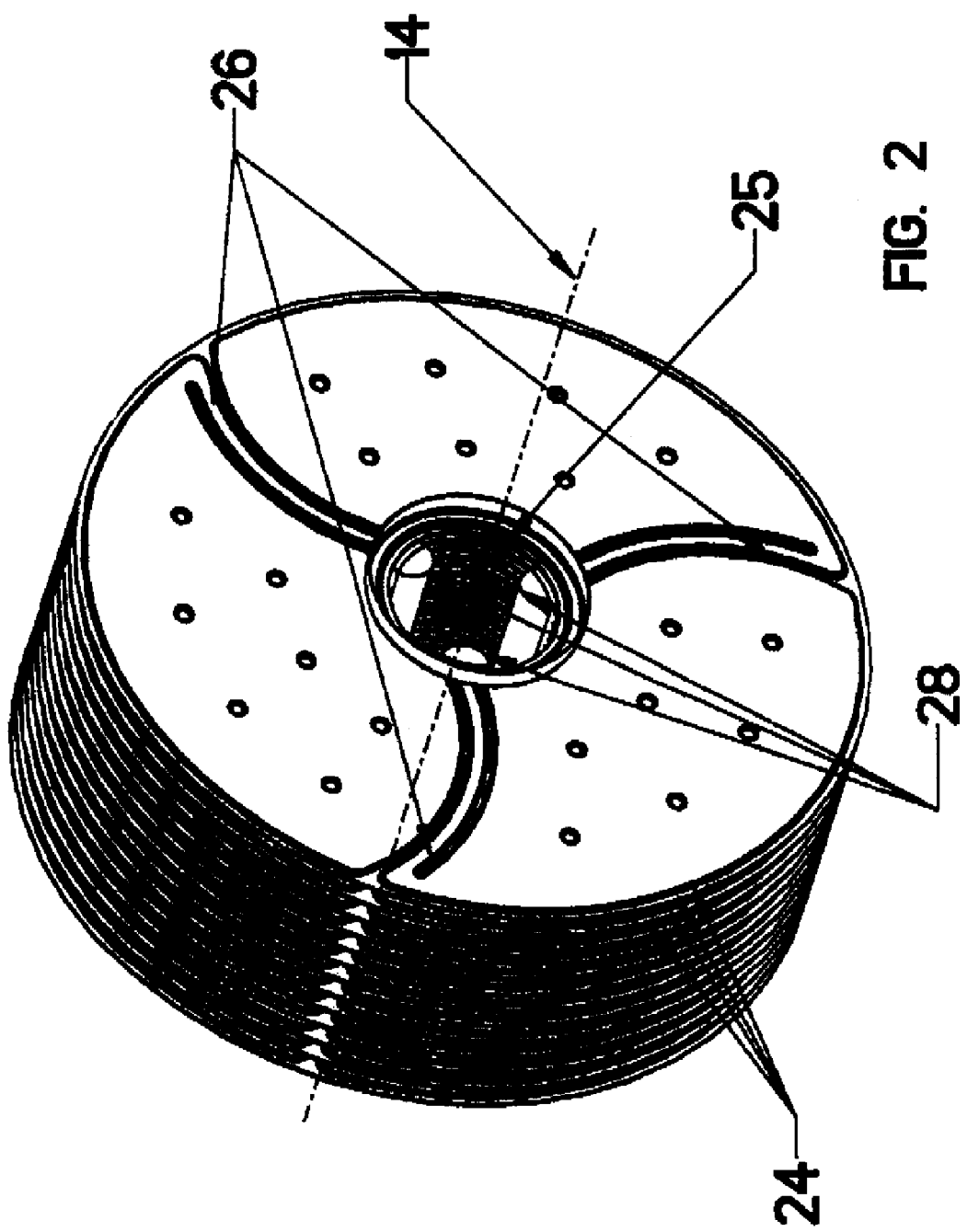
FIG. 2 is a perspective view of a portion of the distiller of FIG. 1, in accordance with the first exemplary embodiment of the present invention.

FIG. 2 is a perspective view of a portion of the distiller 10 of FIG. 1, in accordance with the first exemplary embodiment of the present invention. More specifically, FIG. 2 shows details of the plurality of substantially vertical plates 24. At least a portion of each of the substantially vertical plates 24 is submerged within the quantity of water inside the liquid-tight enclosure 20. Each of the substantially vertical plates 24 has an opening 25. A groove 26 is formed along a face of each of the substantially vertical plates 24. A first end of the groove 26 on each of the substantially vertical plates 24 is proximate to the opening 25. At least one manifold 28 extends through a plurality of the openings 25 of the substantially vertical plates 24. The manifold 28 is in fluid communication with a plurality of the first ends of the grooves 26. As shown in FIG. 1A, an output opening 30 is formed in the liquid-tight enclosure 20. The output opening 30 is arranged in fluid communication with the manifold 28.

In the first exemplary embodiment, the liquid-tight enclosure 20 includes a sump pan 12 and a steam chamber 16. The liquid-tight enclosure 20 may be constructed of any of a number of materials that are known to those having ordinary skill in the art. The sump pan 12 may generally be characterized as an enclosure capable of housing a quantity of liquid. The liquid-tight enclosure 20 may include at least one opening for inputting water and at least one output opening 30 for dispensing fluid. As used herein, fluid may include water, steam, a combination thereof, or any other liquid or gas or combination thereof. The input water is intended to be tap water, although other water sources may be utilized without departing from the scope of the invention, such as mineral-infused, chemical, or pathogens-infused water, or water that includes added compositions. The heating element (not shown) may be within the base of the sump pan 12, placed to supply vapor directly into the vapor side of the heat exchanger including on the positive pressure side of the compressor or be of an immersion configuration placed into the sump water supply. The heating element may include any number of designs that are known to those having ordinary skill in the art, such as electrical, fossil fuel or thermal powered designs. The heating element may require a power source and the sump pan 12 may need to be constructed to sustain prolonged periods of significant heat without structural harm.

The plurality of substantially vertical plates 24 is shown in FIG. 2. The substantially vertical plates 24 are at least kept sufficiently vertical such that a portion of each of the substantially vertical plates 24 is submerged in the water at all times (although the portion submerged may change over time) and at least a portion of each of the substantially vertical plates 24 is out of the water (presumably submerged in steam) at all times. The substantially vertical plates 24 may also be characterized as disks having radii may be aligned on a substantially horizontal central axis, wherein the radii of the disks are situated perpendicular to the substantially horizontal central axis. The substantially vertical plates 24 may be made to rotate such that a portion of a face of each of the substantially vertical plates 24 is always submerged and a portion of a face of each of the substantially vertical plates 24 is always above the water, with water carried on the portion of the substantially vertical plates 24 above water at least partially evaporating before that portion resubmerges.

Each of the substantially vertical plates 24 has at least one groove 26, but may include any number of grooves 26. The substantially vertical plates 24 shown in FIG. 2 each have three grooves 26 on one face. One end of each of the grooves 26 is proximate to the opening 25 and, preferably, meets the opening 25. An opposing end of each of the grooves 26 may extend to a periphery of the substantially vertical plates 24, although the radial length of the grooves 26 relative to the radius of the substantially vertical plates 24 is inconsequential to the scope of the invention. The grooves 26 may be straight, may arc, or may follow various other geometries. Two or more of the grooves 26 may share an end at the opening 25. The purpose of the grooves 26 may be to collect and guide fluid into the manifolds 28 traversing the opening 25. Any groove 26 geometry that can satisfy this purpose is considered to be within the scope of the present invention.

The substantially vertical plates 24 may also include other design features, such as chamfered edges, textured edges, arced faces or other features, which may be included to optimize or otherwise improve the distillation process. One such design feature that may be included on the substantially vertical plates 24 is a surface finish applied to the face of the substantially vertical plates 24, which may optimize adhesion of the quantity of water to each of the substantially vertical plates 24. The surface finish may include dimples stamped into each of the substantially vertical plates 24 or may be formed from the application of a coating, a chemical treatment, a laser etching process, an abrasion or stamping die, or any other available to alter the surface of the substantially vertical plates 24, as one having ordinary skill in the art would recognize.

It should be noted that the orientation of the faces of the substantially vertical plates 24 is vertical, with each of the substantially vertical plates 24 partially submerged in the water. A vertical orientation also may be defined as substantially vertical, where the face of the substantially vertical plates 24 is configured substantially perpendicular to the axis of the substantially vertical plates 24, and the axis is disposed horizontally. This vertical orientation allows surface wetting of the substantially vertical plates 24 with relatively slow rotation speed. A vertical orientation is contrasted with distillation plates having horizontally oriented faces, which require rapid rotation speed that can spray water. Spraying water may result in cross-contamination by introducing undistilled water droplets into the steam vapor. Reduced rotational speed of the substantially vertical plates 24 may also contribute to reduced wear on the substantially vertical plates 24 and other elements of the distiller 10, thereby prolonging a useful lifetime of the distiller 10. The distiller 10 having a vertical orientation can be effective with a rotational speed of the substantially vertical plates 24 below 100 rotations per minute.

Figure 3:
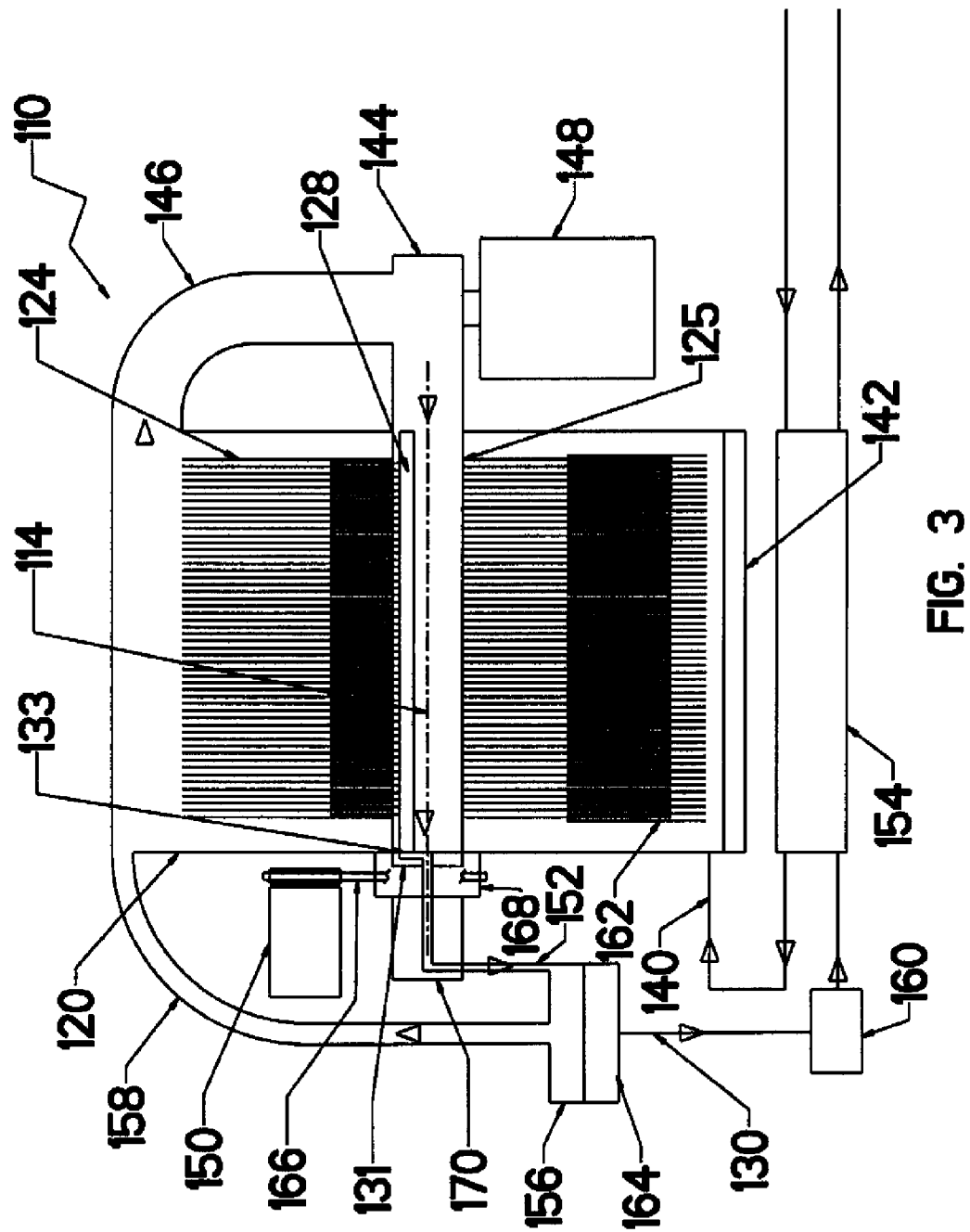
FIG. 3 is a schematic drawing of a distiller, in accordance with a second exemplary embodiment of the present invention.

FIG. 3 is a schematic drawing of a distiller 110, in accordance with a second exemplary embodiment of the present invention. The distiller 110 contains a liquid-tight enclosure 120. An input source 140 is connected to the liquid-tight enclosure 120 for inputting water into the liquid-tight enclosure 120. A heating element 142 is in thermal communication with at least a portion of the water within the liquid-tight enclosure 120. A plurality of substantially vertical plates 124 is aligned along a substantially horizontal axis 114 within the liquid-tight enclosure 120. At least a portion of each of the substantially vertical plates 124 is submerged within the water inside the liquid-tight enclosure 120. Each of the substantially vertical plates 124 has an opening 125. A groove (not shown, but not unlike the groove 26 of FIG. 2) is formed along a face of each of the substantially vertical plates 124. A first end of the groove on each of the substantially vertical plates 124 is proximate to the opening 125. At least one manifold 128 extends through a plurality of the openings 125 of the substantially vertical plates 124. The manifold 128 may have one or more exit ports 133, and is in fluid communication with a plurality of the first ends of the grooves. An output opening 130 is formed in the liquid-tight enclosure 120. The output opening 130 is arranged in fluid communication with the manifold 128.

The distiller 110 may also include a compressor 144 in fluid communication with a first end of the manifold 128 and separately in fluid communication with the liquid-tight enclosure 120, via a flow tube 146. The compressor 144 may be controlled by a system controlled motor 148. A collection chamber 164 may be in fluid communication with a second end of the manifold 128. The compressor 144 may force fluid through the manifold 128, through a valve 170 and into the collection chamber 164 via a separation chamber 156. The collection chamber 164 and the separation chamber 156 may be configured as a single vessel, wherein distillate is collected within the collection chamber 164. The separation chamber 156 may have a negative pressure from the connection with the liquid-tight enclosure 120. The compressor 144 may utilize steam from the liquid-tight enclosure 120, via the flow tube 146, to force fluid through the manifold 128 and into the collection chamber 164. A distillate flow path 152 may be in communication with the collection chamber 164, whereby distilled water is released. The manifold 128 may include a thermal insulator sleeve (not shown) applied to an exterior of the manifold 128. The thermal insulator sleeve may reduce heat transfer from the steam flow into the distillate stream.

The present invention may be described as a vapor compression distiller. Vapor compression distillation, which is an established art, uses a compressor 144 to collect steam from a source, in this case the liquid-tight enclosure 120, via pressure deltas and elevates the pressure, thus the temperature of the steam. Within the liquid-tight enclosure 120, the pressure drops, lowering the boiling temperature thus increasing the steam supply. Water to steam is known to expand 1600×. Thus, a purpose of the heating element 142 is to maintain the required temperature to induce boiling, whereas the compression of the steam may be a substantial source of heat generation.

The compressor 144 is arranged such that steam is ported from the liquid-tight enclosure 120 to the compressor 144, which may elevate the pressure (thus temperature) of steam to approximately 1 atmosphere or greater in the interior of the paired-plate array. At least partially concurrently, the compressor 144 may induce a reduction in pressure within the liquid-tight enclosure 120 inducing vaporization at a temperature at approximately 1 atmosphere or less than that of effectuating a thermal delta on opposing sides of the substantially vertical plates 124. The thermal delta may result in systemic thermal recycling. The compressor 144 may thereby regulate a pressurized atmosphere within the liquid-tight enclosure 120.

The distiller 110 may also include a counter-flow heat exchanger 154 in fluid communication with both the distillate water flow path 152 and the input source 140. The distilled water in the distillate flow path 152 is hot from the distiller 110 and the input water 140 is a relatively ambient temperature, cooler than the recently distilled water, such that the distilled water heats the input water and the input water cools the distilled water within the counter-flow heat exchanger 154.

A separation chamber 156 may also be in communication with the distillate flow path 152. The separation chamber 156 may release steam back into the liquid-tight enclosure 120 through a re-feed path 158 while releasing distilled water through the output opening 130. A distillate pump 160 may assist in releasing the distilled water from the separation chamber 156 and/or feeding the counter-flow heat exchanger 154.

The plurality of substantially vertical plates 124 may further be arranged as an array of paired substantially vertical plates 124, wherein pairs of the substantially vertical plates 124 are abutting. The abutting pairs of the substantially vertical plates 124 may have the grooves formed symmetrically, wherein the grooves combine to form a channel between the abutting pairs of the substantially vertical plates 124.

The distiller 110 may also include a rotation motor 150 in mechanical communication with the plurality of substantially vertical plates 124 for rotating the plurality of substantially vertical plates 124. As shown in FIG. 3, the rotation motor 150 may be in mechanical communication with the substantially vertical plates 124 through a pulley 166 and a vertical plate axle 168. Other means of communicating motion from the rotation motor 150 to the vertical plate axle 168 are known to those having ordinary skill in the art and all such means of communicating motion between the rotation motor 150 and the vertical plate axle 168 are considered to be within the scope of the present invention. Activation of the rotation motor 150 may initiate movement of the substantially vertical plates 124 which may result in wetting the substantially vertical plates 124 from the quantity of water.

The distiller 110 may also include a valve plate 131 in communication with the one or more exit ports 133 of the manifold 128. The exit port 133 may be any outlet structure in communication with the manifold 128. The valve plate 131 may maintain a vapor pressure within the plurality of vertical plates 124 during at least a portion of a horizontal rotation cycle of the plurality of substantially vertical plates 124. The valve plate 131 may also release the vapor pressure within a specified dwell angle range of rotation, or any number of dwell angle ranges of rotation, which allows expulsion of a distillate from the manifold 128, effectuating communication with the separation chamber 156. The valve plate 131 may include a variety of different designs, as one having ordinary skill in the art would recognize. All valve design and structures that enable maintaining vapor pressure within the plurality of vertical plates 124 and allow a release vapor pressure accordingly are considered within the scope of the present disclosure.

Figure 4:
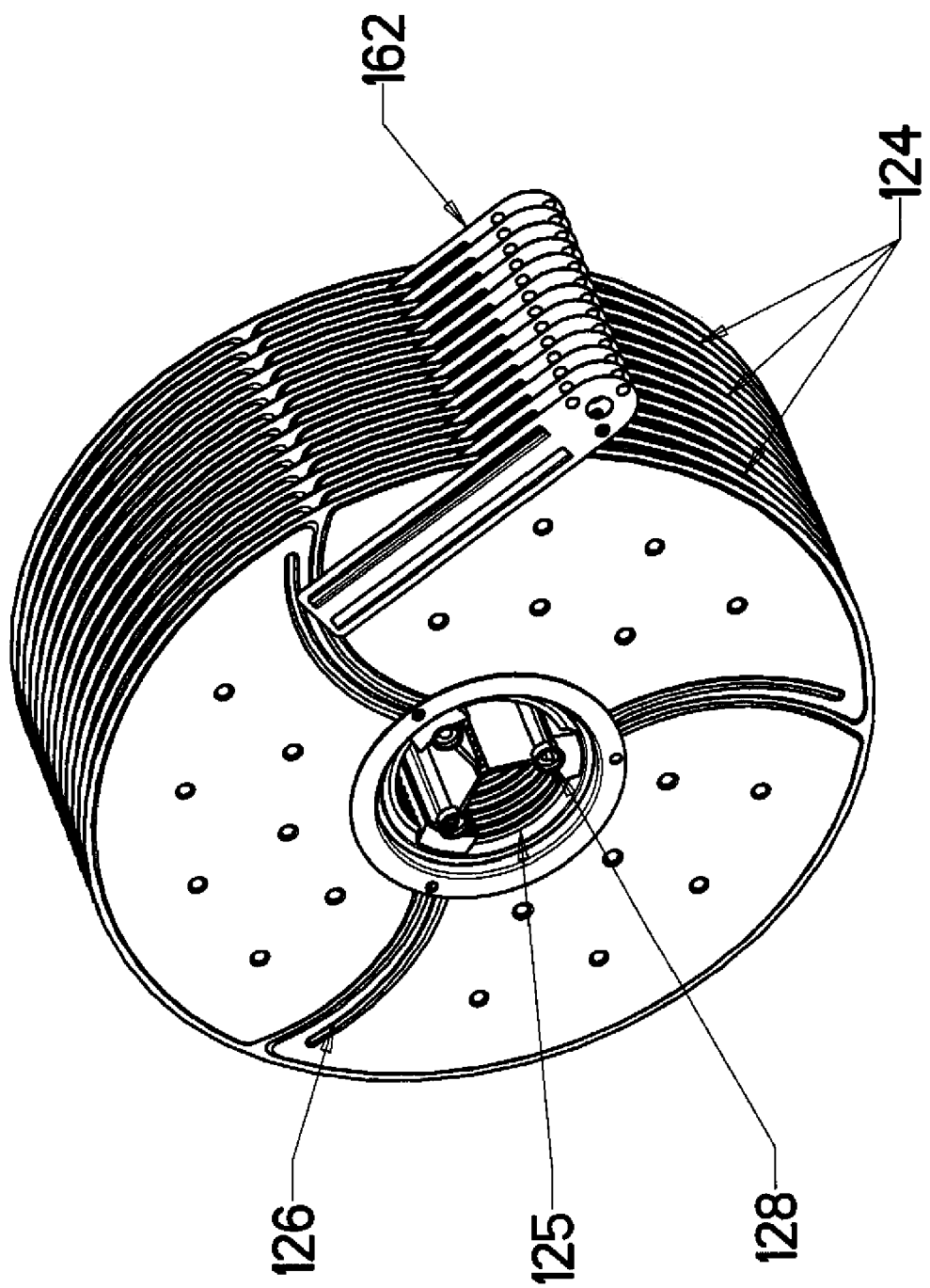
FIG. 4 is an exploded illustration of the distiller shown in FIG. 3, in accordance with the second exemplary embodiment of the present invention.

FIG. 4 is a perspective view of a portion of the distiller of FIG. 3, in accordance with the second exemplary embodiment of the present invention. The distiller 110 includes a plurality of substantially vertical plates 124. A groove 126 is formed along a face of each of the substantially vertical plates 124. A first end of the groove 126 on each of the substantially vertical plates 124 is proximate to the opening 125. At least one manifold 128 extends through a plurality of the openings 125 of the substantially vertical plates 124. The manifold 128 is in fluid communication with a plurality of the first ends of the grooves 126.

The distiller 110 may also include a plurality of wiper blades 162. The wiper blades 162, which may also be referred to as cleaning scrapers, may be generally characterized as any number of structures that may wipe or scrape the face of the substantially vertical plates 124. Each wiper blade 162 may be positioned between a portion of two of the substantially vertical plates 124. Each wiper blade 162 may be positioned to clean a portion of a surface of at least one substantially vertical plate 124, removing sediment deposited from evaporation. The wiper blades 162 may also include an abrasive texture on at least a portion of the wiper blades 162. The abrasive texture may optimize a surface finish on the face of the plurality of substantially vertical plates 124, which may result in a better wetting of the substantially vertical plates 124. The abrasive texture may include surface treatments or design configurations on the wiper blades 162, including, but not limited to serrations, friction enhancing textures and rigid or flexible scraping blades. The abrasive texture may also maintain the substantially vertical plates 124 face for optimal wetting.

Figure 5:
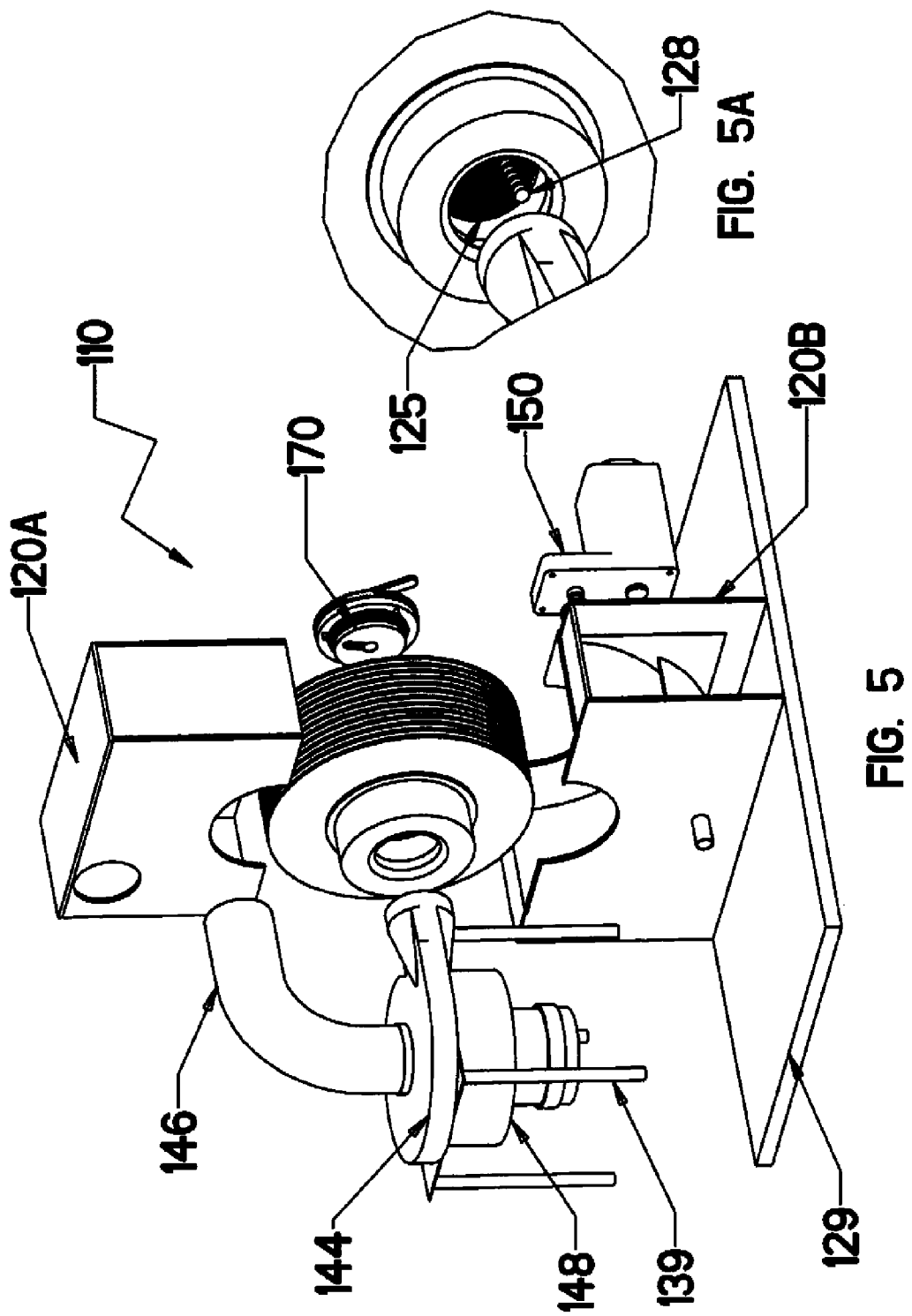
FIG. 5 is a perspective view of a portion of the distiller of FIG. 3, in accordance with the second exemplary embodiment of the present invention.

FIG. 5 and FIG. 5A is an exploded illustration of the distiller 110 shown in FIG. 3, in accordance with the second exemplary embodiment of the present invention. The distiller 110 contains a liquid-tight enclosure 120, formed by attachable enclosure top 120A and enclosure bottom 120B. A plurality of substantially vertical plates 124 is aligned along a substantially horizontal axis within the liquid-tight enclosure 120. At least a portion of each of the substantially vertical plates is submerged within the water inside the liquid-tight enclosure 120. At least one manifold 128 extends through a plurality of the openings 125 of the substantially vertical plates 124. A stand 129 may be used as a base for the distiller 110.

The distiller 110 may also include the compressor 144 in fluid communication with a first end of the manifold 128 and separately in fluid communication with the liquid-tight enclosure 120, via a flow tube 146. The compressor 144 may be controlled by a system controlled motor 148 and supported by a plurality of legs 139. The compressor 144 may force fluid through the manifold 128 and into the collection chamber 164. The compressor 144 may utilize steam from the liquid-tight enclosure 120, via the flow tube 146, to force fluid through the manifold 128 and into the collection chamber 164. The distiller 110 may include a valve 170 in mechanical communication with the plurality of substantially vertical plates 124. Additionally, the distiller 110 may also include a rotation motor 150 in mechanical communication with the plurality of substantially vertical plates 124 for rotating the plurality of substantially vertical plates 124.

Figure 6:
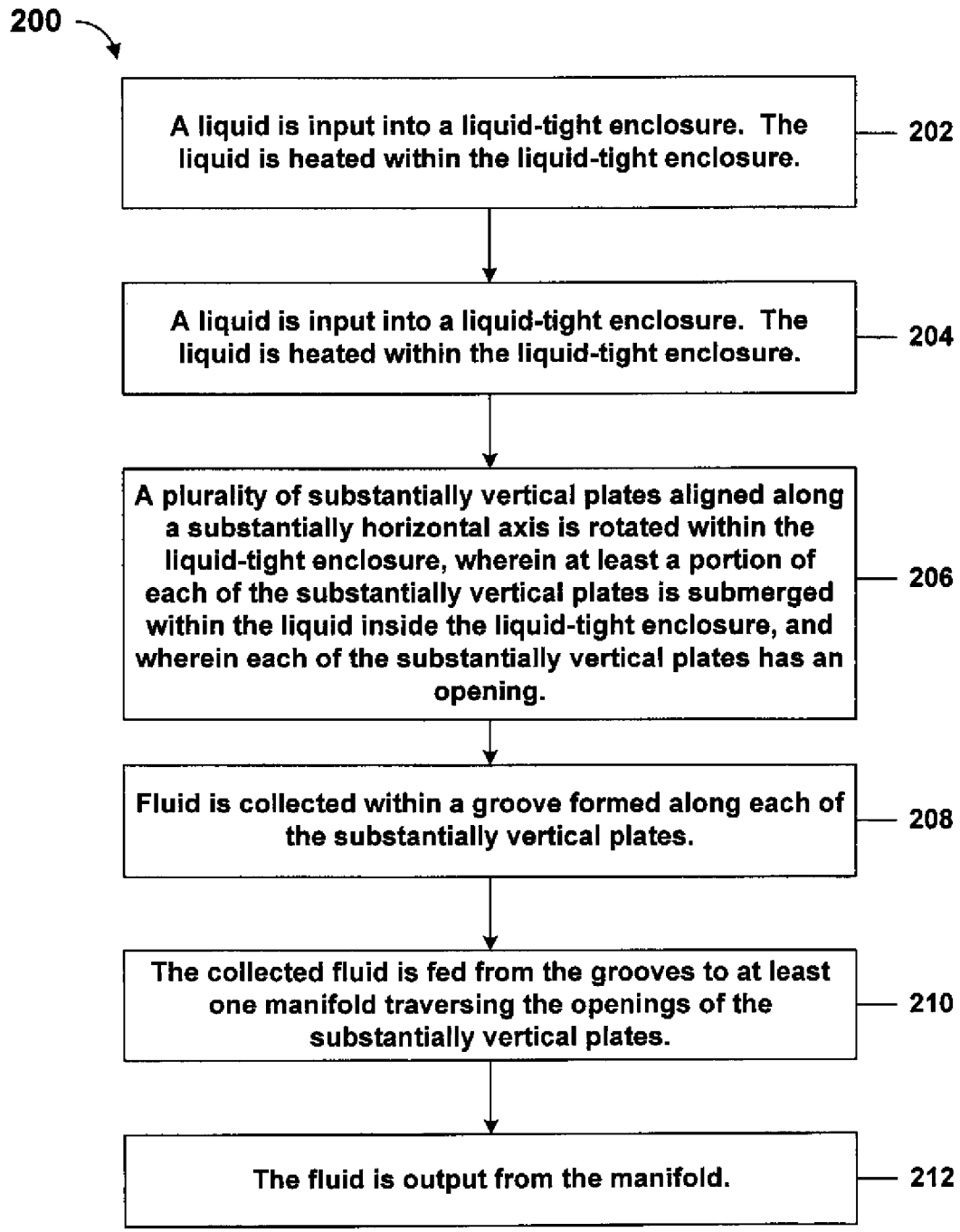
FIG. 6 is a flowchart illustrating a method of distilling utilizing the distiller of FIG. 3, in accordance with the second exemplary embodiment of the invention.

FIG. 6 is a flowchart 200 illustrating a method of distilling utilizing the abovementioned distiller 110 in accordance with the second exemplary embodiment of the invention. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 202, a liquid is input into a liquid-tight enclosure 120. The liquid is heated within the liquid-tight enclosure 120 (block 204). A plurality of substantially vertical plates 124 aligned along a substantially horizontal axis 114 is rotated within the liquid-tight enclosure 120, wherein at least a portion of each of the substantially vertical plates 124 is submerged within the liquid inside the liquid-tight enclosure 120, and wherein each of the substantially vertical plates 124 has an opening 125 (block 206). Fluid is collected within a groove formed along each of the substantially vertical plates 124 (block 208). The collected fluid is fed from the grooves to at least one manifold 128 traversing the openings 125 of the substantially vertical plates 124 (block 210). The fluid is output from the manifold 128 (block 212). The method may also include a step of wiping or scraping the face of the substantially vertical plates 124 to optimize wetting of the substantially vertical plates 124 from the fluid.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment of the invention without departing substantially from the spirit and principles of the invention. All such modifications and variations are intended to be included herein within the scope of this disclosure and the present invention and protected by the following claims.

What is claimed is:

1. A distiller, comprising:
a liquid-tight enclosure;
an input source connected to the liquid-tight enclosure for inputting a quantity of water into the liquid-tight enclosure;
a heating element in thermal communication with at least a portion of the quantity of water within the liquid-tight enclosure;
a plurality of substantially vertical rotatable plates aligned along a substantially horizontal axis within the liquid-tight enclosure, wherein at least a portion of each of the substantially vertical rotatable plates is submerged within the quantity of water inside the liquid-tight enclosure, and wherein each of the substantially vertical rotatable plates has an opening;
a groove fixed with each of the substantially vertical rotatable plates, wherein the groove rotates with each of the substantially vertical rotatable plates, wherein a first end of the groove on each of the substantially vertical rotatable plates is proximate to the opening;
at least one manifold, having one or more exit ports, the manifold extending through a plurality of the openings of the substantially vertical rotatable plates, wherein the manifold is in fluid communication with a plurality of the first ends of the grooves during a rotation of the plates to communicate fluid from the grooves directly to the manifold; and
an output opening formed in the liquid-tight enclosure, the output opening arranged in fluid communication with the manifold.

2. The distiller of claim 1, wherein the plurality of substantially vertical rotatable plates further comprises an array of paired substantially vertical rotatable plates, wherein pairs of the substantially vertical rotatable plates are abutting.

3. The distiller of claim 2, wherein the abutting pairs of the substantially vertical rotatable plates have the grooves formed symmetrically, wherein the grooves form a channel between the abutting pairs of the substantially vertical rotatable plates.

4. The distiller of claim 1, further comprising a compressor in fluid communication with a first end of the manifold and separately in fluid communication with the liquid-tight enclosure.

5. The distiller of claim 4, further comprising:
a collection chamber in fluid communication with a second end of the manifold, whereby the compressor can force fluid through the manifold and into the collection chamber; and
a distillate flow path in communication with the collection chamber, whereby distilled water is released.

6. The distiller of claim 5, further comprising a counter-flow heat exchanger in fluid communication with both the distillate water flow path and the input source, whereby the distilled water in the distillate flow path is hot from the distiller and the input water is relatively ambient, such that the distilled water heats the input water and the input water cools the distilled water within the counter-flow heat exchanger.

7. The distiller of claim 1, further comprising a plurality of dimples stamped in each of the substantially vertical rotatable plates.

8. The distiller of claim 1, further comprising a plurality of wiper blades, each wiper blade positioned between a portion of two of the substantially vertical rotatable plates.

9. The distiller of claim 8, further comprising at least one of an abrasive texture and exposed edge treatments on at least a portion of the plurality of wiper blades, wherein the abrasive texture and the edge treatments optimize a surface finish on the plurality of substantially vertical rotatable plates.

10. The distiller of claim 1, further comprising a rotation motor in mechanical communication with the plurality of substantially vertical rotatable plates for rotating the plurality of substantially vertical rotatable plates.

11. The distiller of claim 1, further comprising a surface finish on each of the substantially vertical rotatable plates, wherein the surface finish optimizes adhesion of the quantity of water to each of the substantially vertical rotatable plates.

12. The distiller of claim 11, wherein the surface finish on each of the substantially vertical rotatable plates is formed from at least one of a coating, a chemical treatment, laser etching, abrasion and stamping dies.

13. The distiller of claim 4, further comprising a system controlled motor controlling the compressor.

14. The distiller of claim 5, further comprising a separation chamber in communication with the distillate flow path, wherein the separation chamber may release a quantity of steam received from the collection chamber into the liquid-tight enclosure.

15. The distiller of claim 14, wherein the separation chamber may release distilled water received from the collection chamber.

16. The distiller of claim 14, further comprising a valve plate in communication with the one or more exit ports of the at least one manifold, wherein the valve plate maintains a vapor pressure within the plurality of substantially vertical rotatable plates during at least a portion of a horizontal rotation cycle and releases the vapor pressure within at least one specified dwell angle range of rotation, thereby allowing expulsion of a distillate from the at least one manifold, effectuating communication with the separation chamber.

17. A method for distillation, the method comprising the steps of:

inputting a liquid into a liquid-tight enclosure;
heating the liquid within the liquid-tight enclosure;
rotating a plurality of substantially vertical plates aligned along a substantially horizontal axis within the liquid-tight enclosure, wherein at least a portion of each of the substantially vertical plates is submerged within the liquid inside the liquid-tight enclosure, and wherein each of the substantially vertical plates has an opening;
collecting fluid within a groove fixed with each of the substantially vertical plates and rotating with each of the substantially vertical plates;
feeding the collected fluid from the grooves to at least one manifold connected to a first end of the grooves, wherein the manifold traverses the openings of the substantially vertical plates; and
outputting fluid from the manifold.

18. A system for distilling fluid, the system comprising:
a liquid-tight chamber having a first portion and a second portion, the first portion housing a quantity of liquid;
a plurality of rotatable disks having a radii, the plurality of rotatable disks aligned on a substantially horizontal central axis, wherein the radii of the plurality of rotatable disks are situated perpendicular to the substantially horizontal central axis and the plurality of rotatable disks are submerged at least partially within the quantity of liquid;
a groove fixed with each of the plurality of rotatable disks and rotatable with each of the plurality of rotatable disks, wherein the groove has at least a first end;
a rotation mechanism, situated to rotate and wet the plurality of rotatable disks to communicate fluid from the groove directly to a manifold positioned within an opening within each of the plurality of rotatable disks; and
a compressor, regulating a pressurized atmosphere within the liquid-tight chamber.

19. The system for distilling fluid of claim 18, wherein the plurality of rotatable disks rotate less than 100 rotations per minute.

20. The system for distilling fluid of claim 18, wherein the compressor creates a thermal variance between the first portion and the second portion, wherein the thermal variance results in a systemic thermal recycling.

21. The system for distilling fluid of claim 18, wherein the plurality of rotatable disks further comprise a surface texture optimizing the wetting of the plurality of disks.

* * * * *